(12) United States Patent
Hania et al.

(10) Patent No.: US 9,037,395 B2
(45) Date of Patent: May 19, 2015

(54) MOBILE DEVICE THAT OPERATES DIFFERENTLY IN DIFFERENT REGIONS

(75) Inventors: Simon Hania, The Hague (NL); Rutger Plantenga, The Hague (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 141 days.

(21) Appl. No.: 13/995,961

(22) PCT Filed: Dec. 20, 2010

(86) PCT No.: PCT/EP2010/070292
§ 371 (c)(1),
(2), (4) Date: Jun. 20, 2013

(87) PCT Pub. No.: WO2012/084004
PCT Pub. Date: Jun. 28, 2012

(65) Prior Publication Data
US 2013/0275038 A1    Oct. 17, 2013

(51) Int. Cl.
*G01C 21/00* (2006.01)
*G01C 21/20* (2006.01)

(52) U.S. Cl.
CPC ............... *G01C 21/00* (2013.01); *G01C 21/20* (2013.01)

(58) Field of Classification Search
None
See application file for complete search history.

(56) References Cited

U.S. PATENT DOCUMENTS

| 7,263,441 | B1 | 8/2007 | Janky et al. |
| 2006/0094445 | A1 | 5/2006 | Park |
| 2013/0053141 | A1* | 2/2013 | Guerin et al. ................... 463/31 |
| 2013/0275038 | A1* | 10/2013 | Hania et al. ................... 701/408 |

OTHER PUBLICATIONS

International Search Report issued Sep. 20, 2011 for International Application No. PCT/ EP2010/070292.

* cited by examiner

*Primary Examiner* — Thomas Tarcza
*Assistant Examiner* — Adam Alharbi (57) ABSTRACT

A system is disclosed comprising a mobile device including at least one application which may be run on the device. The system is configured to be able to determine the geographical location of the mobile device and includes an enforcement engine that is separate to and outside of the at least one application. The enforcement engine is configured to permit or restrict a function of said at least one application on the mobile device depending on the location the device is determined to be at. The system operates to control the functioning of the application based on how the local regulations allow the application to be operated.

20 Claims, 4 Drawing Sheets

MOBILE DEVICE THAT OPERATES DIFFERENTLY IN DIFFERENT REGIONS

CROSS-REFERENCES TO RELATED APPLICATIONS

This application is the National Stage of International Application No. PCT/EP2010/070292, filed Dec. 20, 2010 and designating the United States. The entire content of this application is incorporated herein by reference.

FIELD OF THE INVENTION

This invention relates to mobile devices, and preferably navigation systems. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the Go Live 1000 model manufactured and supplied by TomTom International B.V., provide a reliable means for enabling users to navigate from one position to another.

In certain countries and regions, there are regulations as to what type of information can be displayed to a driver and what information can be collected by and uploaded from a navigation device. As the device moves between different jurisdictions these regulations may change.

At present, it is the responsibility of the designers of applications that are run on the navigation device to ensure that the applications meet the regulations in each of the jurisdictions that the navigation device is used in. This typically involves designing different applications for jurisdictions with different regulations. Alternatively, the applications on the navigation device could each be designed to include complex access rules and a central server could indicate which applications are allowed to operate. This latter approach would be problematic in that applications are desired to be run on a standardized platform and accessed using an application store. As such, the applications are required to be generic, making it problematic to embed the required access rules into the applications. Furthermore, this approach would render the various designers of the applications potentially liable for breaking the regulations in various jurisdictions, if the applications do not fully comply with the local regulations.

The above problems also apply to mobile devices other than navigation devices and which include applications that should operate differently in different regions.

The present invention provides an improved system and method for controlling applications on mobile devices.

SUMMARY OF THE INVENTION

The present invention provides a system comprising:
a mobile device including at least one application which may be run on the device; and
an enforcement engine separate to and outside of said at least one application;
wherein said system is configured to be able to determine the geographical location of the mobile device; and
wherein said enforcement engine is configured to permit or restrict one or more functions of said at least one application on the mobile device depending on the location the device is determined to be at.

By providing an enforcement engine that is separate to the at least one application installed on the mobile device (i.e. that is not embedded in the coding of the applications), the present invention enables the at least one application to remain generic and not programmed specifically for operation only in certain geographical locations. The enforcement engine can be easily updated with new or modified rules as to how and if the applications should operate in different locations, rather than having to update each application individually. Also, the programmers of the applications are not required to have intimate knowledge as to how and if the applications should be operated in different locations. This knowledge need only be available to the entity that designs the enforcement engine and the rules therefor.

For the avoidance of doubt, the term "application" used herein refers to the technical construct of a program written to be executed on the mobile device. The at least one application, when permitted to perform its function(s), preferably accesses data outside of the application itself and then processes this data in some way. The enforcement engine in the present invention either permits or restricts one or more functions of the application based on the location of the mobile device. Therefore, the application may be permitted to obtain data from outside of the application and process this data or may alternatively be restricted from obtaining and/or processing the data, depending on the location of the mobile device. For example, if the application is a speed camera alert system, the enforcement engine may permit the application to access a database of speed camera information, process this information and then alert the user to speed cameras. Alternatively, the enforcement engine may restrict the functioning of the application to prevent the application from alerting the user to speed cameras, depending on the location of the mobile device.

The present invention includes an enforcement engine, which is preferably software based, and which controls how the at least one application should operate based on the location of the mobile device. More specifically, the enforcement engine has access to rules associated with the particular region in which the device is located and which determine how the enforcement engine should control the at least one application. If these rules permit the at least one application to perform its one or more intended functions when the mobile device is located in the current region then the enforcement engine allows the application to perform these functions. On the other hand, if these rules restrict the operation of the application in the current region then the enforcement engine restricts one or more of the application's functions. Different sets of rules are provided for different regions, such that the enforcement engine permits the at least one application to perform its function(s) in a first region and restricts the same application(s) from performing its function(s) in a second, different region. The different regions are different geographical regions having different rules as to how the at least one application is allowed to operate. For example, the different regions may be different countries, different regions of the same country, different states or different counties.

The mobile device may store or have access to the rules associated with one, two or more than two regions at any one time. For example, the mobile device may store or have access to the rules for just the region in which the device is currently located. Alternatively, the mobile device may store or have access to the rules for the current region and any or all regions which are geographically adjacent to the region that the device is currently located in.

The system is preferably configured such that when the mobile device has moved or is moving from a first region having a first set of rules associated therewith to a second region having a second different set of rules associated therewith, the enforcement engine automatically stops operating according to the first set of rules and starts operating according to the second set of rules so as to control the at least one application according to the second rules.

The system may be configured to cause the enforcement engine to begin to operate according to the rules for the second region when the mobile device is located at the boundary between the first and second regions or only after the device has passed into the second region. If a second region having less strict rules than the first region is being approached, then it is preferred to ensure that the change is implemented only after the mobile device has passed into the second region. This may mean that the rules for the first region are applied for a short period of time when the device is in the second region. The rules are determined to be more strict in one region as compared to another if the rules restrict the functions of an application more in said one region than in the other region. Preferably, the rules are determined to be more strict in one region as compared to another region if every application controlled by the enforcement engine is operated in the same manner or is more restricted in said one region as compared to the operation of the corresponding applications in the other region.

Alternatively, the system may be configured to cause the enforcement engine to begin to operate according to the rules for the second region when the mobile device is still in the first region, but is at a predetermined distance or expected travel time from the second region. In this situation, the system may be configured to only cause the enforcement engine to begin to operate according to the rules for the second region if the mobile device is determined to be travelling towards the second region. This is useful if the second region has more strict rules than the first region, in which case it is preferred that the change is implemented before the mobile device enters the second region.

Accordingly, if a border between two regions is being approached, in order to determine when the enforcement engine should apply the rules of the first region or the second region, a comparison may be made between the rules of the two regions. The comparison is preferably made when the device is at a particular distance from the border between the two regions or when the device is at a predetermined geographical location near the border. The comparison is preferably only made if the system determines that the mobile device is travelling towards the border.

Preferably, the enforcement engine is located on the mobile device. The at least one application is supported by the application framework of the device, which may have access to the various libraries and drivers of the device's operating system. The enforcement engine is preferably part of the application support framework on the mobile device and is preferably arranged between the operating system of the mobile device and the at least one application. However, less preferably the enforcement engine may be located on a server that is remote from and communicates with the mobile device wirelessly.

The rules for the region(s) may be stored on the mobile device. These rules may be updated by periodic upgrades by the user or by automatic upgrades sent from a remote server. Alternatively, or additionally, the system may be configured so that when the device is in a first region and is at a predetermined distance from a second region, the device automatically downloads the rules for the second region from a remote database. It is also contemplated herein that the rules may not be stored on the mobile device, but may be stored on a remote database, e.g. a central authority. In this case the system is configured such that the enforcement engine in the device may access the rules periodically or in real-time.

The enforcement engine is configured to permit or restrict the one or more functions of at least one application on the mobile device depending on the location the device is determined to be at. The enforcement engine permits an application to perform one or more of its intended functions in one region, e.g. the engine may allow full operation of the application when the device is in the region. The enforcement engine restricts the application from performing one or more of its intended functions in another region, i.e. prevents the full operation of the application when the device is in said another region. The application may be partially restricted, such that only certain functions of the application are prevented, or all of the functions of the application may be prevented.

The one or more application functions that are either permitted or restricted by the enforcement engine may be any one, or any combination of any number of the following functions: retrieving data/information outside of the application itself; processing data/information; displaying data/information; receiving certain types of input from a user (driver); or providing certain types of output to a user (driver).

Preferably, the enforcement engine is embedded in all communications flow between the mobile device and elements external to the mobile device.

The mobile device is preferably a navigation device and the application is preferably for use during navigation. However, the device according to the present invention may be for purposes other than navigation. The device may be any mobile device such as a mobile (or "smart") phone, a tablet computer, an electronic book or a device on board a vehicle such as a car or ship, etc.

Preferably, one of the at least one applications is a speed camera alert system, which when permitted to function on the mobile device alerts the user of the presence of speed limit enforcement cameras. In many regions such camera alert systems are allowed, but in other regions they are not. The system determines the location of the mobile device and the enforcement engine accesses the rules for the region that the device is located in. If the device is determined to be in a region where speed camera alert systems are allowed to operate then the enforcement engine permits the application for the speed camera alert system to be fully functional. This application may then function to access a database including information on the location of speed cameras and preferably also the speed limit that the cameras are enforcing. The application then functions to process this information and presents it to the user of the mobile device.

In contrast, if the mobile device is determined to be in a region where speed camera alert systems are not allowed to operate then the enforcement engine restricts the functioning of the application for the speed camera alert system. The application may be prevented from performing the function of accessing the database including information on the location of speed cameras. This database may be located on the mobile device or on a remote server. Alternatively, the application may be prevented from performing the function of processing the speed camera information or may be prevented from performing the function of instructing presentation means to present the information to the user of the mobile device.

Preferably, one of the at least one applications that is controlled by the enforcement engine may be an application which presents information to a user of the device. The information is preferably navigation information. The enforcement engine may allow such information to be presented to the user in one region and prevent the presentation of such information to the user in another region. The enforcement engine may control the function of the application to prevent it from obtaining the information to be presented, to prevent the application from processing the information such that it can be presented, or to prevent the application from instructing presentation means to present the information. The visual and/or auditory presentation of such information may be prevented in some regions.

Preferably, one of the at least one applications that is controlled by the enforcement engine may be an application which automatically uploads information from the mobile device to a remote server. The enforcement engine may allow such uploads in one region and restrict such uploads in another region. The system may be configured such that the enforcement engine restricts the uploads by controlling the application to prevent all uploads to remote servers. Alternatively, the enforcement engine may restrict the functioning of the application such that it only prevents uploads to remote servers that are outside of the region in which the device is currently located. Alternatively, the enforcement engine may restrict the application such that it only prevents uploads to remote servers that are inside of the region in which the device is currently located. The function of the application may be controlled by the enforcement engine to prevent the application from obtaining the information to be uploaded, to prevent processing of information into a form to be uploaded, or to prevent the application from instructing uploading means to upload information.

The application may be one which automatically uploads information on the location of the mobile device to a remote server. For example, the application may be one which uploads a vehicle's location to a central or remote server. Alternatively, the application may be one which uploads geographical information to a remote server. Alternatively, the application may be one which collects GPS positions and/or map corrections and uploads this information to a remote server. Alternatively, the at least one application that is controlled by the enforcement engine may be an application which collects information and uploads such information in real time to a remote server.

Preferably, one of the at least one applications that is controlled by the enforcement engine may be an application which automatically collects information relating to the surroundings of the mobile device. The enforcement engine may allow such collecting in one region and restrict such collecting in another region. The system may be configured such that the enforcement engine prevents such collecting.

The application may be one which automatically collects information on the location of the mobile device. Alternatively, the application may be one which collects geographical information and/or GPS positions and/or map corrections. The enforcement engine may restrict the functioning of the application by preventing it from receiving the information to be collected, preventing it from processing the information or preventing it from storing the information.

Preferably, one of the at least one applications that is controlled by the enforcement engine may be an application which automatically downloads information from a remote server to the mobile device. The enforcement engine may allow such downloads in one region and restrict such downloads in another region. The system may be configured such that the enforcement engine restricts the downloads by preventing all downloads from remote servers. Alternatively, the enforcement engine may restrict the application such that it only prevents downloads from remote servers that are outside of the region in which the device is currently located. Alternatively, the enforcement engine may restrict the application such that it only prevents downloads from remote servers that are inside of the region in which the device is currently located.

The application may be one which downloads geographical information to the mobile device. Alternatively, application may be one which downloads speed camera information, geographical data, or map corrections.

Preferably, one of the one or more functions that is controlled by the enforcement engine is the ability for the application to be operated (i.e. activated or controlled) via at least one type of user input. The enforcement engine permits or restricts the operation of the application via the at least one type of user input depending upon the location of the mobile device. The system or device therefore preferably includes user input means for operating the application.

Accordingly, in a first region the enforcement engine may permit a person using the device to provide an input which causes the application to operate, whereas in a second region the enforcement engine may prevent the same form of user input from operating the application. The enforcement engine may permit or prevent all types of user input from operating the application, depending on the location of the device.

Alternatively, the enforcement engine may permit or prevent only certain types of input from operating the application depending on the location of the device. For example, the system may include user input means that are controlled by touch and the enforcement engine may permit the application to be operated via touch in one region, but not in another region. Additionally, or alternatively, the system may include voice activated input means and the application may be operated via a user's voice. The enforcement engine may permit the application to be operated via voice control in both regions or only in one region and not the other region.

The mobile device may be configured request authorisation from the user to remove the restriction on the operation of the at least one application, the restriction being maintained until such authorisation has been input into the device. Alternatively, the system may be configured such that the restriction cannot be removed until the mobile device has moved to another region that permits the at least one application to run.

Preferably, the mobile device is configured to be able to determine its location. Preferably, the mobile device includes a GPS antenna for receiving satellite-broadcast signals including location data, and the device is configured to process such signals to determine a current location of the device. The system claimed herein may consist of the mobile device. Alternatively, the system may comprise the mobile device and further elements, such as a remote server for communicating with the device. For example, the rules and/or enforcement engine may be located remotely from the mobile device and may communicate therewith via the remote server.

Preferably, the mobile device is a portable navigation device (PND), a smart phone or an in-car navigation device.

One or more of the at least one applications may be pre-loaded on the mobile device or may alternatively be added to the device after purchase by a user, e.g. from a suitable application store.

The present invention also provides computer software operable, when executed on a mobile system as described herein above, to cause a processor to:

determine the geographical location of the mobile device; and use said enforcement engine to permit or restrict one or more functions of said at least one application on the mobile device depending on the location the device is determined to be at.

BRIEF DESCRIPTION OF THE DRAWINGS

Various embodiments of the present invention will now be described with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of mobile processing device that is configured to execute navigation software so as to provide route planning and navigation functionality. It follows therefore that in the context of the present application, a navigation device is intended to include (without limitation) any type of mobile route planning and navigation device, irrespective of whether that device is embodied as a PND, a navigation device built into a vehicle, or a mobile telephone or portable digital assistant (PDA)) executing route planning and navigation software.

Figure 1:
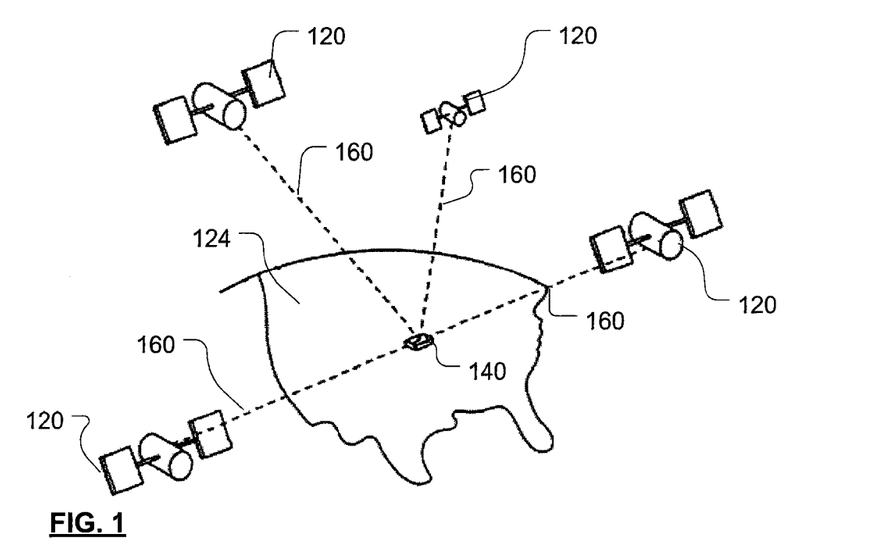
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
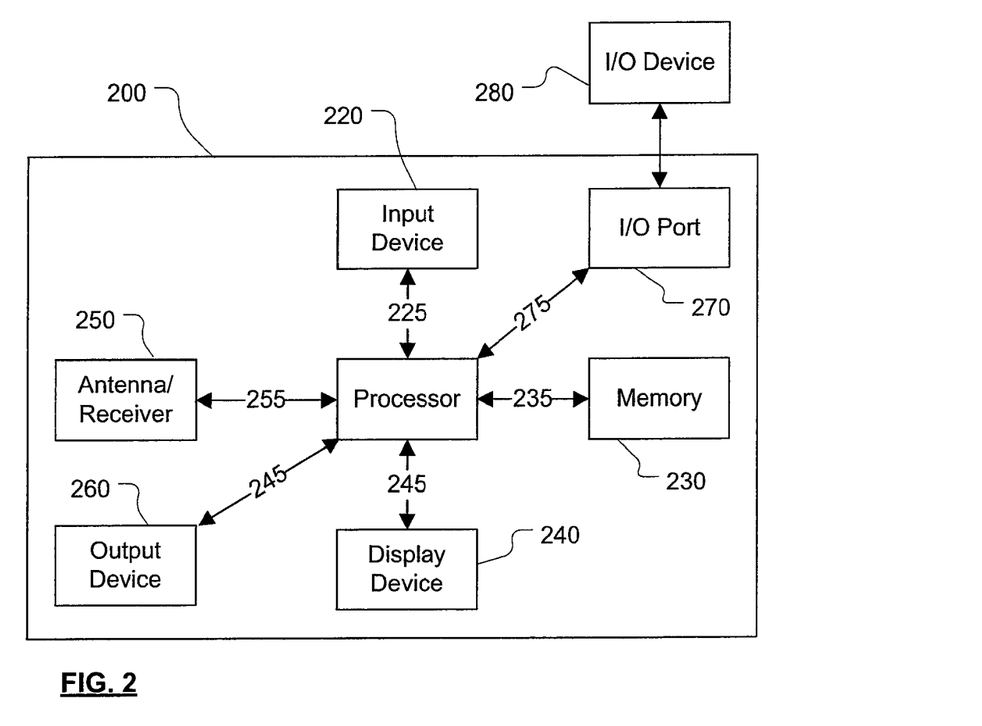
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
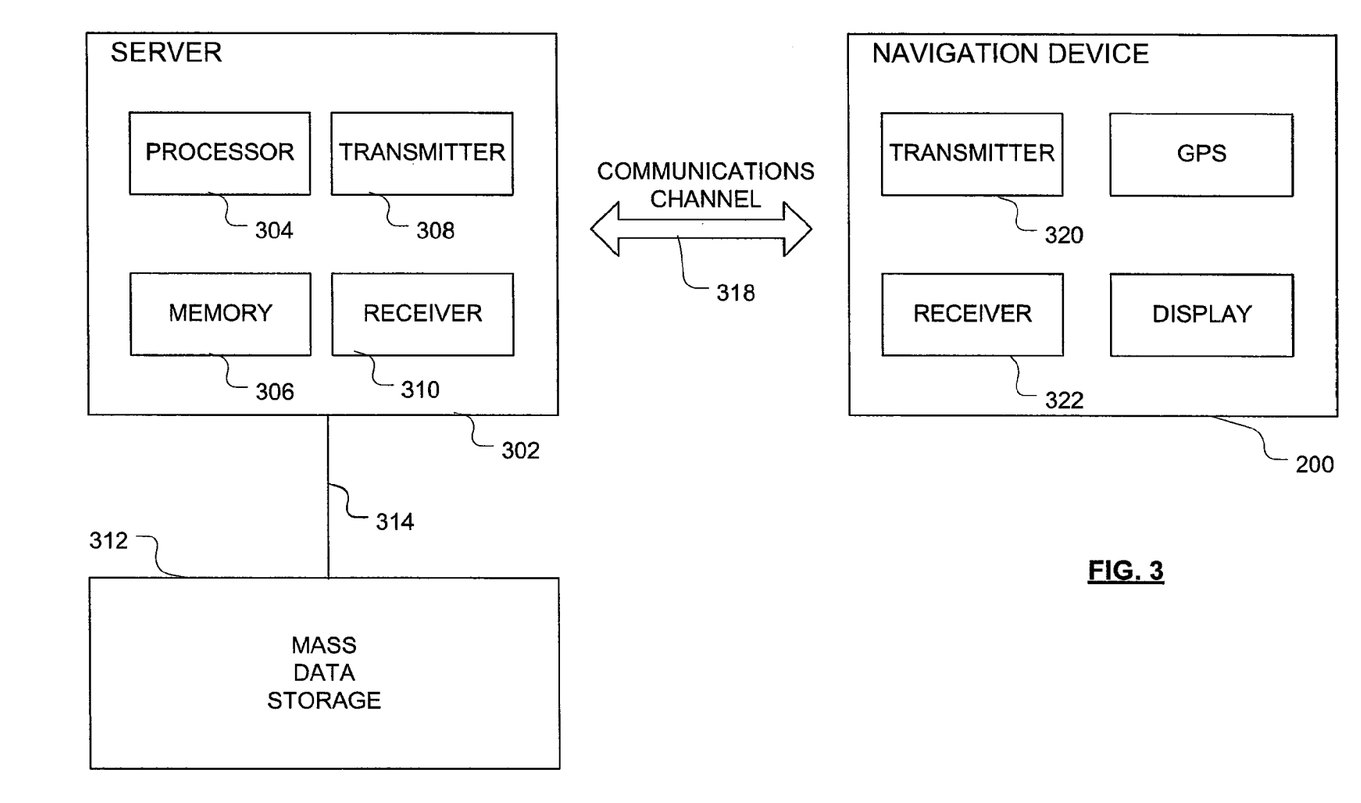
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

As will be appreciated, various applications are installed on the navigation device 200 for accessing and processing data. However, it may be undesirable for certain applications to run in part or in full in certain geographical regions. The present invention provides an enforcement engine which controls the operation of the applications based on the location of the navigation device 200.

Figure 4:
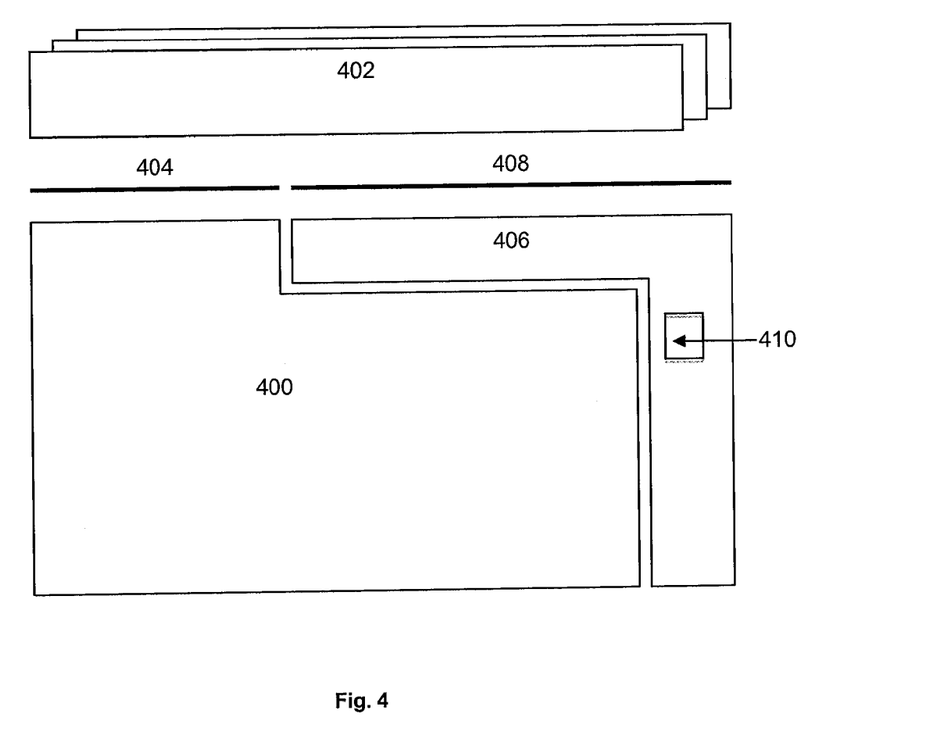
FIG. 4 shows the high level system architecture of a preferred embodiment of the mobile navigation device.

FIG. 4 shows the high level system architecture of components on a mobile navigation device 200 according to a preferred embodiment of the present invention. The navigation device 200 includes an operating system 400, one or more applications 402 and an interface between the operating system and the applications 404. An application support framework 406 is provided for supporting the applications 402 and which has access to the various libraries and drivers of the operating system 400. An interface 408 is provided between the support framework 406 and the applications 402. In the preferred embodiment, an enforcement engine 410 is provided within the application support framework 406.

One or more of the applications 402 has multiple settings, e.g. a full operating mode, a partial operating mode and/or an "off" mode. The application 402 is caused to operate in one of these settings depending on the geographical location of the mobile navigation device 200. The setting that is to be used by each application 402 will depend on the current location determined by the navigation device 200, such that in a first region one of the applications 402 operates in a first mode, while in a second region the same application 402 operates in a second, different mode.

For example, one of the applications 402 may be a speed camera alert system that accesses a database to indicate to a driver when a speed camera is being approached. It is illegal in some jurisdictions to provide this type of information to a user. In the preferred embodiment, the mobile navigation device 200 is operated such that the application 402 for the speed camera alert system is caused to be either "on" (active) or "off" (inactive), depending upon the location that the device 200 has determined that it is at.

The enforcement engine 410 determines and controls which setting an application 402 should be operating in based on the current location of the device. More specifically, the enforcement engine 410 has access to the location of the device 200 and then accesses a set of rules associated with the particular region in which the device 200 is located. The enforcement engine 410 then uses these rules to set the mode in which the application 402 operates. For example, the enforcement engine 410 may access the rules for a first region and determine that speed camera information is not allowed to be presented to the user of the device 200 in that region. The enforcement engine 410 then deactivates the application 402 for the speed camera alert system. Conversely, if the enforcement engine 410 determines that speed camera information is allowed to be presented to the user of the device 200 in the current region, it activates the application 402 for the speed camera alert system. When the device 200 is moved from a region that allows the presentation of speed camera information to the user to another region that does not allow speed camera information to be presented to the user, the enforcement engine switches the application 402 from one mode to the other.

The different regions are preset geographical regions having different rules that need to be complied with. For example, the different regions may be different countries, states, counties etc. In the preferred embodiment, the software operates automatically. Therefore, when a border between two regions is approached the enforcement engine 410 automatically detects this and controls the applications 402 so that they comply with the rules of the new region that is being entered. If a border with less strict rules is approached, then it is preferred to ensure that the changes are implemented only after the border is crossed, even if this means that for a short period of time the current strict rules are applied in the new region. Alternatively, if a border with stricter rules is approached, then it is preferred that the changes are implemented before the new region is entered. Accordingly, if a border is being approached and the mobile device 200 is determined to be within a particular distance of the border then a comparison is made between the rules of the two regions.

The enforcement engine 410 has access to the rules for the region in which the device 200 is located, either through real-time access to a remote database 312 or the rules may be pre-loaded data stored on the device 200 itself. When the rules are down-loaded in real time the rules for a given region may be downloaded when the device 200 is near a border of that region. In the case where the rules are preloaded, the device 200 may store the rules associated with one, two or more different regions. For example, the device 200 may store the rules of only the current region in which the device 200 is located. Alternatively, the device 200 may store the rules for the current region in which the device 200 is located and at least one or all geographically adjacent regions. The rules are pre-defined, although they can be updated as needed.

Although an application 402 for a speed camera alert system has been described as being switched between different modes, additional or different applications 402 may be controlled by the enforcement engine 410. For example, an application for presenting other types of information (by visual display or audio) can be switched between active and inactive modes depending on the rules for the region in which the device 200 is located. Additionally, or alternatively, an application 402 for collecting and storing information, such as geographical location and/or altitude, can be switched between active and inactive modes depending on the rules for the region in which the device 200 is located.

Figure 5:
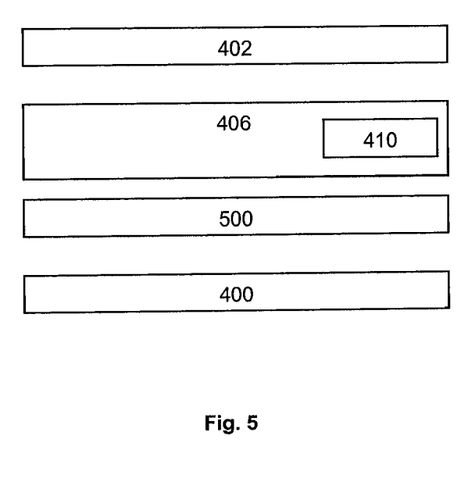
FIG. 5 shows a preferred embodiment of a software stack on a preferred mobile navigation device.

FIG. 5 shows a software stack that may be used in a preferred embodiment of the mobile navigation device 200. The stack comprises an OS kernel 400. This may include display drivers, keypad drivers, camera drivers, power management, audio drivers, etc. The stack also comprises libraries 500, e.g. including graphics libraries, runtime libraries etc. The stack also comprises an application framework 406, which includes the enforcement engine 410 and may also include, for example, a window manager, resource manger notification manger, a telephony manager, etc. The stack also comprises the one or more applications 402.

As described above, the compliance software in the enforcement engine 410 detects the current location of the device 200 and applies the necessary rules associated with that position, e.g. restricting the display of certain information or the uploading or downloading of certain information.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A system comprising:
a mobile device including at least one application which may be run on the device; and
an enforcement engine separate to and outside of said at least one application;
wherein said system is configured to be able to determine the geographical location of the mobile device; and
wherein the enforcement engine is configured to access different rules associated with different geographical regions, the system being configured such that when it determines that the device is located in a first region the enforcement engine accesses a first set of rules and permits said one or more functions to be performed; and when the mobile device is determined to be in the first region, but within a predetermined distance or expected travel time from a second region, the enforcement engine accesses a second set of rules associated with the second region and operates according to the second set of rules so as to restrict the same one or more functions from being performed.

2. The system of claim 1, wherein the mobile device is configured to determine its geographical location and includes said enforcement engine.

3. The system of claim 1, wherein the enforcement engine is configured to access rules associated with the geographical region in which the mobile device is determined to be located, the enforcement engine being configured to permit or restrict said one or more functions in response to said rules, when the device is located in said region.

4. The system of claim 1, wherein the enforcement engine is configured to access different rules associated with different geographical regions, the system being configured such that when the system determines that the device is located in a first region the enforcement engine accesses a first set of rules and permits one or more of said functions to be performed, whereas when the system determines that the device is located in a second different region the enforcement engine accesses a second set of rules and restricts the same one or more functions from being performed.

5. The system of claim 4, wherein the system is configured to cause the enforcement engine to begin to operate according to the rules for the second region when the mobile device is located at the boundary between the first and second regions or only when the device is located at least a predetermined distance inside of the second region.

6. The system of claim 1, wherein the system is configured to cause the enforcement engine to begin to operate according to the rules for the second region only if the system determines that the mobile device is travelling towards the second region.

7. The system of claim 1, wherein the enforcement engine is configured to access different rules associated with different geographical regions for instructing the enforcement engine to permit or restrict said one or more functions, wherein the system is configured so that when the mobile device is located in one region and is at a predetermined distance or expected travel time from another region, the device begins to download the rules for said another region from a remote database.

8. The system of claim 1, wherein the enforcement engine is configured such that it permits or restricts said one or more functions by permitting or preventing said at least one application from accessing, processing or displaying information.

9. The system of claim 1, wherein one of the at least one applications controlled by the enforcement engine is a speed camera alert system which, when permitted to function, alerts the user of the presence of speed limit enforcement cameras.

10. The system of claim 1, wherein one of the at least one applications that is controlled by the enforcement engine is an application which, when permitted to function, presents information to a user of the device.

11. The system of claim 1, wherein one of the at least one applications that is controlled by the enforcement engine is an application which, when permitted to function, automatically uploads information from the mobile device to a remote server.

12. The system of claim 11, wherein said one of the at least one applications is one which is configured to perform one or more of the following:
a) upload information regarding the location of the mobile device to a remote server;
b) upload geographical information to a remote server;
c) collect GPS positions and/or map corrections and upload this information to a remote server; or
d) collect information and upload such information to a remote server in real time.

13. The system of claim 1, wherein one of the at least one applications that is controlled by the enforcement engine is an application which, when permitted to function, automatically collects information relating to the surroundings of the mobile device.

14. The system of claim 13, wherein the application is one which is configured to do one or more of the following:
a) collect information on the location of the mobile device;
b) collect geographical information; or
c) collect GPS positions.

15. The system of claim 1, wherein one of the at least one applications that is controlled by the enforcement engine is an application which, when permitted to function, automatically downloads information from a remote server to the mobile device.

16. The system of claim 15, wherein the application is one which downloads geographical information or speed camera information.

17. The system of claim 1, wherein one of said functions that is controlled by the enforcement engine is the ability for said at least one application to be operated via at least one type of user input, and the enforcement engine permits or restricts the operation of the application via the at least one type of user input depending upon the location of the mobile device.

18. A non-transitory computer readable medium comprising program segments which, when executed on a processor of a navigation device, perform the method of controlling a system comprising a mobile device and an enforcement engine, wherein the mobile device includes at least one application which may be run on the device and the enforcement engine is separate to and outside of said at least one application; the method comprising:

determining the geographical location of the mobile device; and     using said enforcement engine to permit or restrict said one or more functions of said at least one application on the mobile device depending on the location the device is determined to be at, wherein the enforcement engine is configured to access different rules associated with different geographical regions, the system being configured such that when it determines that the device is located in a first region the enforcement engine accesses a first set of rules and permits said one or more functions to be performed; and when the mobile device is determined to be in the first region, but within a predetermined distance or expected travel time from a second region, the enforcement engine accesses a second set of rules associated with the second region and operates according to the second set of rules so as to restrict the same one or more functions from being performed.

19. A non-transitory computer readable medium comprising program segments which, when executed on a processor of a navigation device, perform the method of controlling a system comprising a mobile device and an enforcement engine, wherein the mobile device includes at least one application which may be run on the device and the enforcement engine is separate to and outside of said at least one application; the method comprising:

determining the geographical location of the mobile device; and     using said enforcement engine to permit or restrict said one or more functions of said at least one application on the mobile device depending on the location the device is determined to be at, wherein the enforcement engine is configured to access different rules associated with different geographical regions, the system being configured such that when the system determines that the device is located in a first region the enforcement engine accesses a first set of rules and permits or restricts said one or more functions in response to said rules; and when the mobile device is determined to be in the first region, but within a predetermined distance or expected travel time from a second region, the enforcement engine accesses a second set of rules associated with the second region for instructing the enforcement engine to permit or restrict the same one or more functions, compares the rules for the two regions, and operates according to the set of rules which is more strict.

20. A system comprising:

a mobile device including at least one application which may be run on the device; and an enforcement engine separate to and outside of said at least one application;

wherein said system is configured to be able to determine the geographical location of the mobile device; and wherein the enforcement engine is configured to access different rules associated with different geographical regions, the system being configured such that when the system determines that the device is located in a first region the enforcement engine accesses a first set of rules and permits or restricts said one or more functions in response to said rules; and when the mobile device is determined to be in the first region, but within a predetermined distance or expected travel time from a second region, the enforcement engine accesses a second set of rules associated with the second region for instructing the enforcement engine to permit or restrict the same one or more functions, compares the rules for the two regions, and operates according to the set of rules which is more strict.

\* \* \* \* \*